(12) United States Patent
Lau

(10) Patent No.: US 8,200,833 B1
(45) Date of Patent: Jun. 12, 2012

(54) SECURITY MODE BASED MANAGEMENT OF COOKIE DATA STORES

(75) Inventor: Cynthia W. Lau, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/253,881

(22) Filed: Oct. 5, 2011

(51) Int. Cl.
*G06F 15/16* (2006.01)

(52) U.S. Cl. ......................... 709/228; 709/227

(58) Field of Classification Search .................. 709/227, 709/228
See application file for complete search history.

(56) References Cited

U.S. PATENT DOCUMENTS

| | | | |
|---|---|---|---|
| 2008/0028444 A1* | 1/2008 | Loesch et al. ................. | 726/4 |
| 2011/0106616 A1* | 5/2011 | Bigby et al. ............... | 705/14.49 |
| 2011/0202602 A1* | 8/2011 | Biollo ........................ | 709/204 |
| 2011/0208840 A1* | 8/2011 | Blackman .................. | 709/220 |
| 2011/0247045 A1* | 10/2011 | Rajagopal et al. ............. | 726/1 |

OTHER PUBLICATIONS

"Google Chrome Extensions (Labs)—Cookies, Google Code Labs," <http://code.google.com/chrome/extensions/cookies.html>, Accessed on Apr. 28, 2011.
"Proposal: Chrome Extensions Cookies API, The Chromium Projects," <https://sites.google.com/a/chromium.org/dev/developers/design-documents/extensions/proposal-chrome-extensions-cookies-api>, Accessed on Apr. 28, 2011.
"Multiple Cookie Containers for Firefox—Playing on the Frontier," <http://siphon9.net/loune/2007/05/multiple-cookie-containers-for-firefox/>, Accessed on Sep. 26, 2011.

* cited by examiner

*Primary Examiner* — Mohamed Wasel

(74) *Attorney, Agent, or Firm* — McDermott Will & Emery LLP

(57) ABSTRACT

The subject technology provides a cookie data store with a unique identifier that is implemented for one or more web clients. Each browser can have different cookie storage schemes and limited access to cookie data. The cookie data store ID unifies disparate cookie storage schemes in one or more different web clients in order to perform one or more different operations on one or more cookie data stores in a particular web client.

24 Claims, 5 Drawing Sheets

SECURITY MODE BASED MANAGEMENT OF COOKIE DATA STORES

BACKGROUND

In a given web client (e.g., a web browser), web content can be displayed in the web client. For example, web content can include a mixture of text and graphics (e.g., images or photos, etc.). The web client can maintain one or more cookies to store different data associated with a browsing session(s) on the web client.

SUMMARY

The subject technology provides for determining a cookie data store assigned to a tab in a window frame of a web client. For a session associated with the tab in the window frame of the web client, the subject technology determines a process identifier of the window frame. The subject technology generates a first string based on the process identifier of the window frame. The subject technology determines a security mode of the tab. Next, the subject technology generates a second string based on the security mode of the tab in which the second string indicates the security mode of the tab. The subject technology then assigns the first and second strings as an identifier to the cookie data store assigned to the tab.

The subject technology further provides a system for providing access to a cookie data store. The system includes memory, one or more processors, and one or more modules stored in memory and configured for execution by the one or more processors. The system includes a browser module configured to provide an identifier for a cookie data store of a web client. The system further includes a cookies module configured to determine the cookie data store associated with the identifier from the browser module, and perform one or more operations on the cookie data store based on the identifier.

Additionally, the subject technology provides, for a session associated with a tab in a window frame of a web client, determining a process identifier of the window frame. The subject technology generates a first string based on the process identifier of the window frame. A security mode of the tab is then determined. The subject technology generates a second string based on the security mode of the tab in which the second string indicates the security mode of the tab. The subject technology assigns the first and second strings as an identifier to the cookie data store assigned to the tab. Further, one or more different operations are performed on the cookie data store based on the identifier to the cookie data store.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

Figure 1:
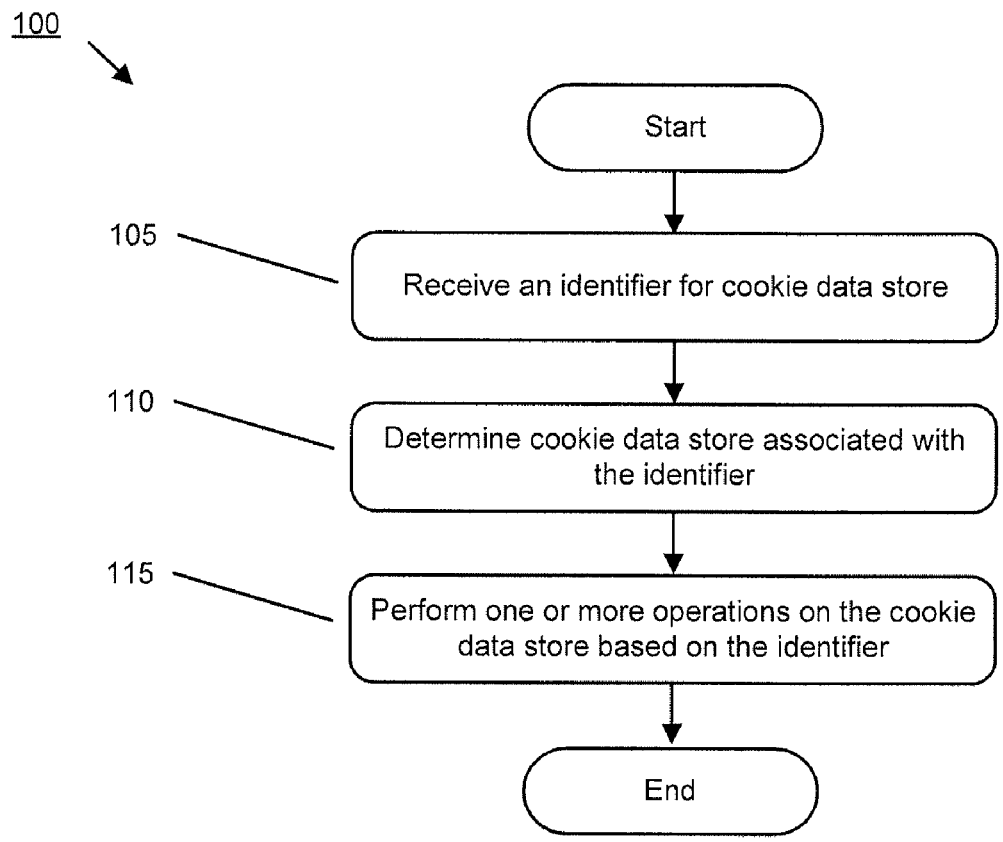
FIG. 1 conceptually illustrates an example process for providing one or more cookie data stores for a web client.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology provides a extensions cookies API for accessing cookies associated with one or more sessions in different web browsers. In particular, the disclosed API will provide a way of accessing cookies in a cookie data store of a browser without requiring network connectivity and the use of HTTP requests. Typically, a browser will implement a proprietary scheme for managing and accessing cookies. Developers therefore have to utilize different browser APIs in order to programmatically access cookies in different browsers. The disclosed cookies API will provide unified API calls to access cookies in a cookie data store irrespective of the browser hosting a session. A developer therefore can utilize the unified API calls in the same manner for any browser in which the cookies API is implemented.

Thus, the cookies API described herein creates a concept of a "cookie data store with a unique identifier" that is implemented for multiple browsers. Each browser can have different cookie storage schemes and with limited API access to those schemes. In that sense, the "cookie data store ID" concept in the cookies API unifies what were previously disparate cookie storage schemes in the different browsers. For instance, a first example web browser can provide a cookie management scheme based on profiles and whether the browser is in a private browsing mode. In contrast, a second example web browser can utilize one cookie store for all cookies (and irrespective of the browsing mode). Further, a third example web browser can implement different browsing modes and sessions and, as a result, have no clear identification of "cookie stores" whatsoever.

Moreover, some browser APIs do not provide a user friendly scheme for tracking multiple sessions within a browser in which each session could utilize its own cookie data store. The subject technology further provides an easier way to determine a corresponding cookie data store of a session in a browser. Depending on the browsing mode of the browser, different security modes could be utilized by the browser. For instance, each tab for a respective session for a web browser can run in a protected or unprotected security mode. The web browser can further provide several security zones corresponding to different levels of trust that grant different permissions to a corresponding session in a tab. Thus, each window frame of the web browser can have multiple tabs and each tab can either be in protected or unprotected mode and/or in a particular security zone. To implement this security model, the web browser maintains separate cookie data stores depending on whether the tab instance is in protected or unprotected mode and/or based on the security zone assigned to the session. As a result of the multiplicity of cookie data stores utilized for managing different sessions, developers could have difficulty in determining a cookie data store assigned to a session for a corresponding tab.

To address the aforementioned issues, the subject technology utilizes the aforementioned cookies API to assign a unique identifier to a tab that corresponds to a cookie data store utilized by the tab. In one example, a process identifier of a window frame is determined to generate a first string. The security mode of the tab (e.g., protected or unprotected mode) is then determined. In an instance in which the security mode is a protected mode, a second string is generated and appended to the first string to form a unique ID for the cookie data store assigned to the tab. The unique ID can then be subsequently used to query for a specific cookie in the cookie data store assigned to the tab. Other operations can be performed using the unique ID. For instance, the cookies API of the subject technology provides the following additional functions: 1) get all cookies in a cookie data store; 2) get all cookie data stores; 3) setting a cookie in a cookie data store; and 4) deleting a cookie in a cookie data store.

FIG. 1 conceptually illustrates an example process 100 for providing one or more cookie data stores for a web client. More specifically, the process 100 can be implemented in order to provide one or more cookie data stores that are associated with respective identifiers. A web client can include a web browser in some configurations.

The process 100 at 105 receives an identifier for a cookie data store of a web client. In some configurations, the identifier can be associated with a cookie data store that includes one or more cookies for the web client. Each cookie from the one or more cookies contains arbitrary data that can include session data. The identifier in some configurations can indicate a first window type for one or more windows of the web client. For instance, the first window type indicates a browsing mode of the web client. The browsing mode is a private browsing mode in one example. The private browsing mode can be implemented differently depending on the web client. In one example, the private browsing mode for the web client can implement one or more privacy features so that the web client does not store browsing information for selected browsing sessions. Consequently, the web client can utilize a different cookie data store when the web client is in a private browsing mode than when in a non-private browsing mode.

At 110, the process 100 determines the cookie data store associated with the identifier. The process 100 at 115 then performs one or more operations on the cookie data store based on the identifier. The one or more operations do not require one or more Hypertext Transfer Protocol (HTTP) requests to complete the one or more operations in some configurations. By way of example, the one or more operations can includes an operation to retrieve information for a single cookie, an operation to retrieve all cookies from the cookie data store, an operation to store a cookie in the cookie data store, an operation to delete a cookie in the cookie data store, or an operation to get all cookie data stores for the web client. After performing the one or more operations, the process 100 ends.

Additionally, the process 100 can receive a second identifier for a second cookie data store. The process 100 can determine the second cookie data store associated with the second identifier and repeat the operation described above at 110. The process 100 can then perform any of the aforementioned operations discussed at 115. In this manner, the process 100 can manage one or more different cookie data stores based on different identifiers for the web client.

Figure 2:
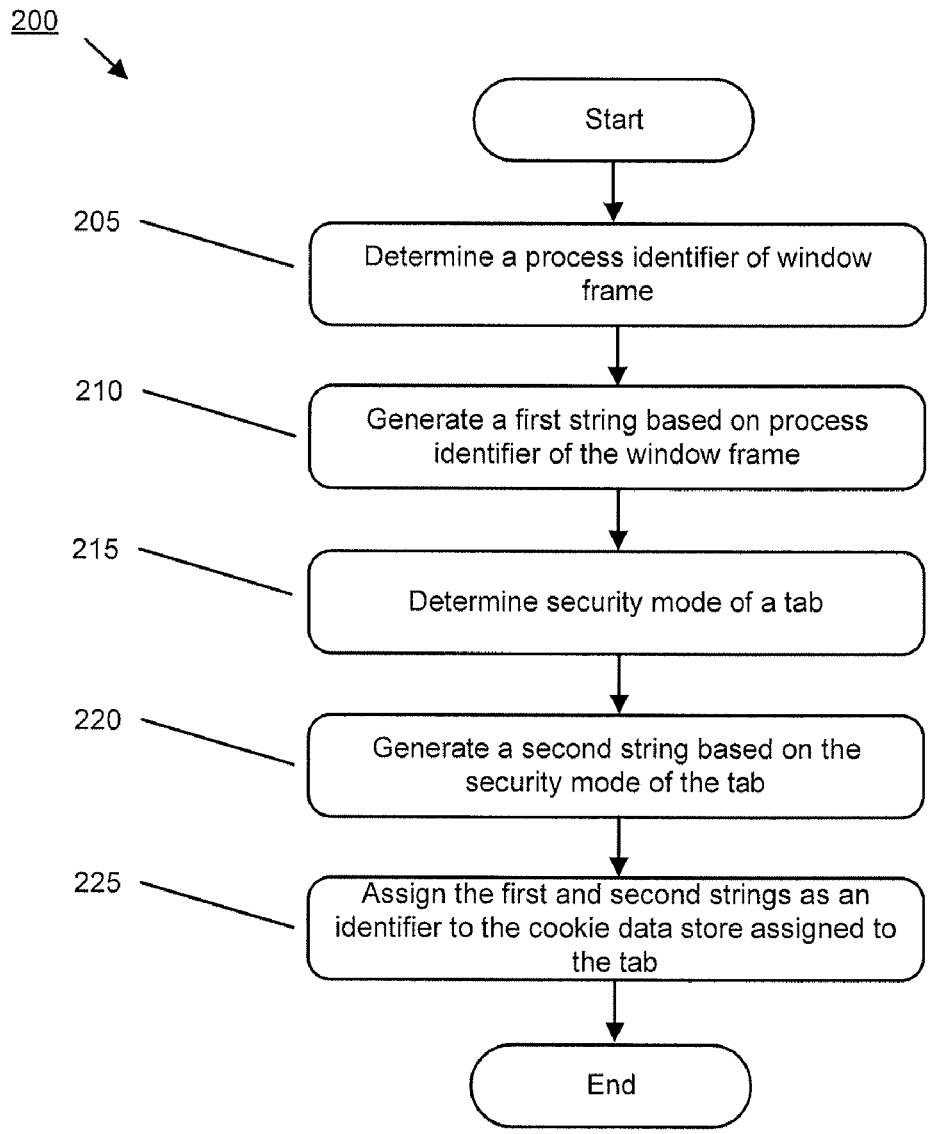
FIG. 2 conceptually illustrates an example process for determining a cookie data store assigned to a tab in a window frame of a web client.

FIG. 2 conceptually illustrates an example process 200 for determining a cookie data store assigned to a tab in a window frame of a web client. In some configurations, the web client can maintain one or more cookie data stores based on a security mode assigned to each window and/or tab instance. The process 200 can be performed in conjunction with the process 100 described above in FIG. 1.

For a session associated with the tab in the window frame of the web client, the process 200 at 205 determines a process identifier of the window frame. The process at 210 generates a first string based on the process identifier of the window frame. In some embodiments, the tab in the window frame includes a second process identifier. The second process identifier is a child process of a parent process associated with process identifier of the window frame in some configurations. The child process of the tab in some configurations can be spawned or forked from the parent process associated with the window frame. Additionally, each tab in the window frame of the web client can include a respective process identifier (e.g., a respective child process of the parent process of the window frame).

At 215, the process 200 determines a security mode of the tab. The security mode is one of a protected or unprotected mode in some configurations. In some configurations, a different cookie data store is utilized based on the security mode. A respective session can be associated to each security mode so that different sessions are provided for each security mode. The security mode indicates an integrity level of the tab in which the integrity level is one of a low integrity level, a medium integrity level, and a high integrity level. The integrity level can be understood as a level of trust granted to a corresponding tab based on its security mode. In one example, the protected mode is associated with the low integrity level. The protected mode disallows write access to one or more system files in some configurations. The protected mode, however, allows access to a corresponding cookie data store associated with the protected mode. Therefore, for a given tab in protected mode, the tab can have access to its corresponding cookie data store but is disallowed access to system files. Further, the unprotected mode is associated with the medium integrity level that grants more privileges to a corresponding tab (e.g., in comparison to a low integrity level of a tab in protected mode).

The process 200 at 220 generates a second string based on the security mode of the tab. The second string indicates the security mode of the tab in some configurations. The process 200 continues to 225 to assign the first and second strings as an identifier to the cookie data store assigned to the tab. In one example, the process 200 can generate the identifier by processing the first and second strings (e.g., concatenation or another string operation). The identifier indicates a first window type in some configurations. For example, the first window type can indicate a browsing mode of the web client such as a private browsing mode. Further, the process 200 can then access the cookie data store based on the identifier. For instance, the process 200 can access the cookie data store by performing one or more different operations similar to those operations described in FIG. 1. In some configurations, the one or more operations do not require network connectivity.

Therefore, the one or more operations can forgo a requirement for utilizing an HTTP request and response communication flow in order to access one or more cookies in the cookie data store. By way of example, the one or more operations includes an operation to retrieve information for a single cookie, an operation to retrieve all cookies from the cookie data store, an operation to store a cookie in the cookie data store, an operation to delete a cookie in the cookie data store, and/or an operation to get all cookie data stores of the web client. Other operations can be provided and still be within the scope of the subject technology. The process 200 then ends.

Figure 3:
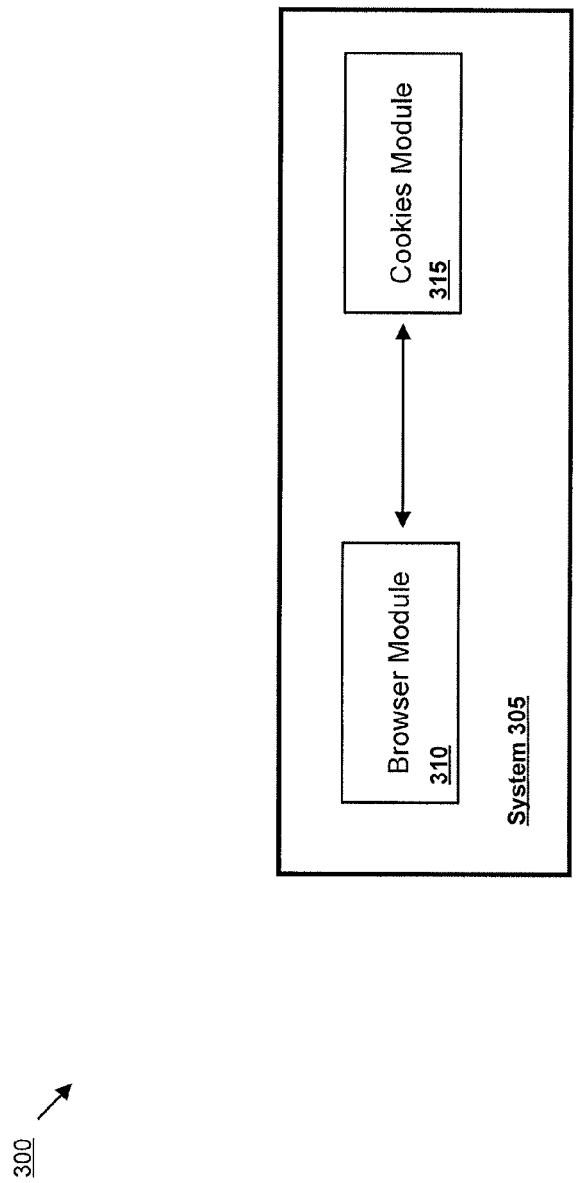
FIG. 3 conceptually illustrates an example computing environment.

FIG. 3 conceptually illustrates an example computing environment including a system for providing access to a cookie data store. In particular, FIG. 3 shows a system 305 for implementing the above described processes FIGS. 1 and 2. In some configurations, the system 305 is part of an implementation running a particular machine. The system 305 can be configured to execute a web client (e.g., web browser) in one example.

As shown in FIG. 3, the system 305 includes several modules for providing different functionality. The system 305 is configured to include a browser module 310 and a cookies module 315. The browser module 310 is configured to provide an identifier associated with a cookie data store of a web client. The cookies module 315 is configured to determine the cookie data store associated with the identifier from the browser module 310, and perform one or more operations on the cookie data store based on the identifier. The one or more operations include at least one of a first operation to retrieve information for a single cookie, a second operation to retrieve all cookies from the cookie data store, a third operation to store a cookie in the cookie data store, a fourth operation to delete a cookie in the cookie data store, or a fifth operation to get all cookie data stores for the web client.

As further shown in FIG. 3, each of the aforementioned modules can be configured to communicate between each other. For instance, different data, messages, API calls and returns can be passed between the different modules in the system 305.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, any combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

An API allows a developer of an API calling component (that could be a third party developer) to utilize specified features provided by an API implementing component. There may be one API calling component or there may be more than one such component. An API can be a source code interface that a computing system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some configurations the API implementing component may provide more than one API, each providing a different view of or with different aspects that access different aspects of the functionality implemented by the API implementing component. For example, one API of an API implementing component can provide a first set of functions and can be exposed to third party developers, and another API of the API implementing component can be hidden (not exposed) and provide a subset of the first set of functions and also provide another set of functions, such as testing or debugging functions which are not in the first set of functions. In other configurations the API implementing component may itself call one or more other components via an underlying API and thus be both an API calling component and an API implementing component.

An API defines the language and parameters that API calling components use when accessing and using specified features of the API implementing component. For example, an API calling component accesses the specified features of the API implementing component through one or more API calls or invocations (embodied for example by function or method calls) exposed by the API and passes data and control information using parameters via the API calls or invocations. The API implementing component may return a value through the API in response to an API call from an API calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API calling component) and an API implementing component. Transferring the API calls may include issuing, initiating, invoking, calling, receiving, returning, or responding to the function calls or messages. In other words, transferring can describe actions by either of the API calling component or the API implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API implementing component. The API calling component therefore can declare variables, use pointers to, use or instantiate constant values of such types or classes by using definitions provided in the API.

Generally, an API can be used to access a service or data provided by the API implementing component or to initiate performance of an operation or computation provided by the API implementing component. By way of example, the API implementing component and the API calling component may each be any one of an operating system, a library, a device driver, an API, an application program, or other module (it should be understood that the API implementing component and the API calling component may be the same or different type of module from each other). API implementing components may in some cases be embodied at least in part in firmware, microcode, or other hardware logic. In some configurations, an API may allow a client program to use the services provided by a Software Development Kit (SDK) library. In other configurations an application or other client program may use an API provided by an Application Framework. In these configurations the application or client program may incorporate calls to functions or methods provided by the SDK and provided by the API or use data types or objects defined in the SDK and provided by the API. An Application Framework may in these configurations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API calling component may be a local component (i.e., on the same data processing system as the API implementing component) or a remote component (i.e., on a different data processing system from the API-implementing component) that communicates with the API-implementing component through the API over a network. It should be understood that an API implementing component may also act as an API calling component (i.e., it may make API calls to an API exposed by a different API implementing component) and an API calling component may also act as an API implementing component by implementing an API that is exposed to a different API calling component.

The API can allow multiple API calling components written in different programming languages to communicate with the API implementing component (thus the API may include features for translating calls and returns between the API implementing component and the API calling component). The API however can be implemented in terms of a specific programming language. An API calling component can, in one configuration, call APIs from different providers such as a set of APIs from an OS provider and another set of APIs from a plug-in provider and another set of APIs from another provider (e.g. the provider of a software library) or creator of the another set of APIs.

The following description describes an example API architecture in which configurations of the subject technology can be implemented.

Figure 4:
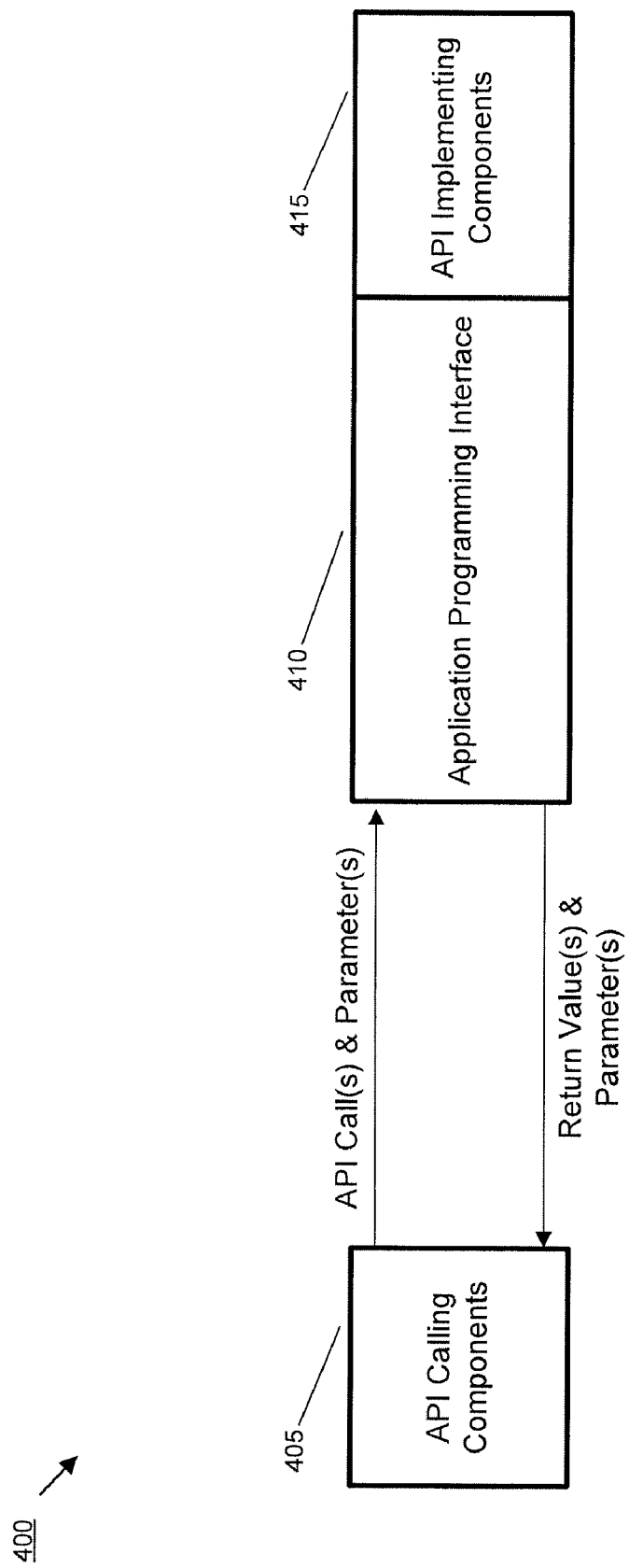
FIG. 4 conceptually illustrates an example application programming interface (API) architecture.

FIG. 4 is a block diagram illustrating an example API architecture, which can be used in some configurations of the subject technology. As shown in FIG. 4, the API architecture 400 includes the API implementing component 415 (e.g., an operating system, a library, a device driver, an API, an application program, software or other module) that implements the API 410. The API 410 specifies one or more functions, methods, classes, objects, protocols, data structures, formats and/or other features of the API-implementing component that can be used by the API-calling component 405. The API 410 can specify at least one calling convention that specifies how a function in the API implementing component receives parameters from the API calling component and how the function returns a result to the API calling component. The API calling component 405 (e.g., an operating system, a library, a device driver, an API, an application program, software or other module), makes API calls through the API 410 to access and use the features of the API implementing component 415 that are specified by the API 410. The API implementing component 415 can return a value through the API 410 to the API calling component 405 in response to an API call.

It will be appreciated that the API implementing component 415 can include additional functions, methods, classes, data structures, and/or other features that are not specified through the API 410 and are not available to the API calling component 405. It should be understood that the API calling component 405 can be on the same system as the API implementing component 415 or can be located remotely and accesses the API implementing component 415 using the API 410 over a network. While FIG. 4 illustrates a single API calling component 405 interacting with the API 410, it should be understood that other API calling components, which can be written in different languages (or the same language) than the API calling component 405, can use the API 410.

The API implementing component 415, the API 410, and the API calling component 405 can be stored in a machine-readable medium, which includes any mechanism for storing information in a form readable by a machine (e.g., a computer or other data processing system). For example, a machine-readable medium includes magnetic disks, optical disks, random access memory, read only memory, flash memory devices, etc.

The following description describes an example system in which aspects of the subject technology can be implemented.

Figure 5:
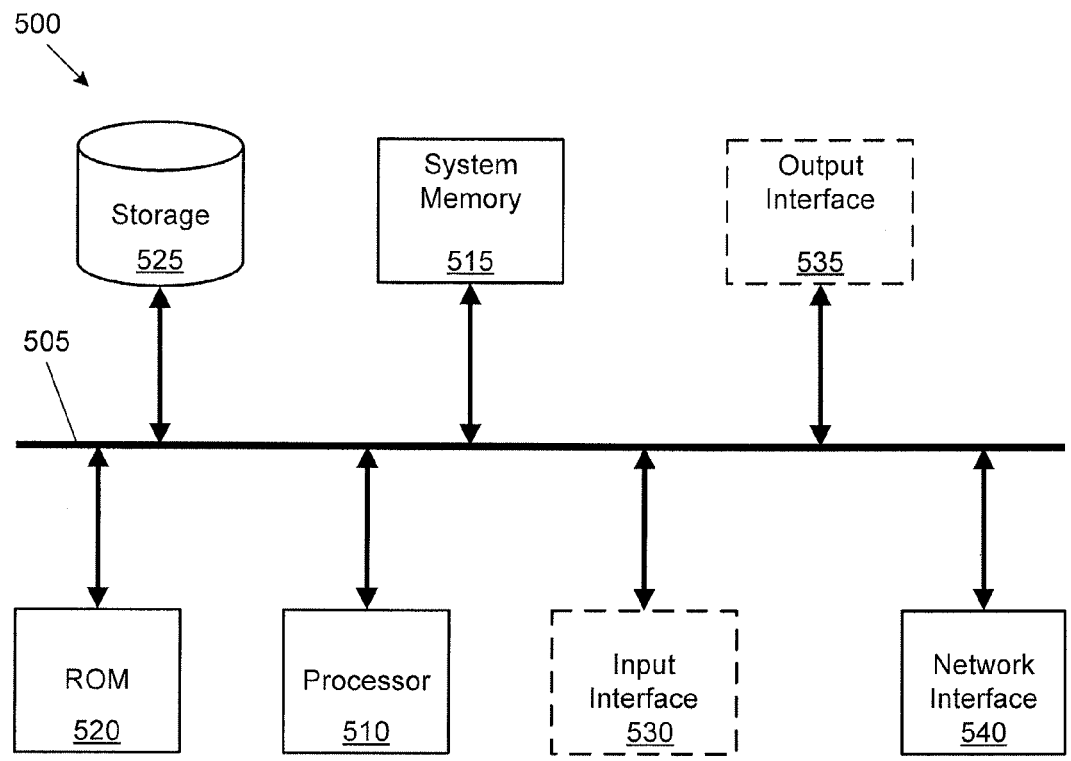
FIG. 5 conceptually illustrates a system with which some implementations of the subject technology may be implemented.

FIG. 5 conceptually illustrates a system 500 with which some implementations of the subject technology can be implemented. The system 500 can be a computer, phone, PDA, or any other sort of electronic device. Such a system includes various types of computer readable media and interfaces for various other types of computer readable media. The system 500 includes a bus 505, processing unit(s) 510, a system memory 515, a read-only memory 520, a storage device 525, an optional input interface 530, an optional output interface 535, and a network interface 540.

The bus 505 collectively represents all system, peripheral, and chipset buses that communicatively connect the numerous internal devices of the system 500. For instance, the bus 505 communicatively connects the processing unit(s) 510 with the read-only memory 520, the system memory 515, and the storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the system 500. The storage device 525, on the other hand, is a read-and-write memory device. This device is a non-volatile memory unit that stores instructions and data even when the system 500 is off. Some implementations of the subject technology use a mass-storage device (such as a magnetic or optical disk and its corresponding disk drive) as the storage device 525.

Other implementations use a removable storage device (such as a flash drive, a floppy disk, and its corresponding disk drive) as the storage device 525. Like the storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the subject technology's processes are stored in the system memory 515, the storage device 525, and/or the read-only memory 520. For example, the various memory units include instructions for processing multimedia items in accordance with some implementations. From these various memory units, the processing unit(s) 510 retrieves instructions to execute and data to process in order to execute the processes of some implementations.

The bus 505 also connects to the optional input and output interfaces 530 and 535. The optional input interface 530 enables the user to communicate information and select commands to the system. The optional input interface 530 can interface with alphanumeric keyboards and pointing devices (also called "cursor control devices"). The optional output interface 535 can provide display images generated by the system 500. The optional output interface 535 can interface with printers and display devices, such as cathode ray tubes (CRT) or liquid crystal displays (LCD). Some implementations can interface with devices such as a touchscreen that functions as both input and output devices.

Finally, as shown in FIG. 5, bus 505 also couples system 500 to a network interface 540 through a network adapter (not shown). In this manner, the computer can be a part of a network of computers (such as a local area network ("LAN"), a wide area network ("WAN"), or an Intranet, or an interconnected network of networks, such as the Internet. Any or all components of system 500 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for determining a cookie data store assigned to a tab in a window frame of a web client, the method comprising:
   for a session associated with the tab in the window frame of the web client, determining a unique identifier of an associated cookie data store;
   for a session associated with a secure tab in the window frame of the web client, determining a second cookie data store associated with a secure tab;
   receiving an identifier for a respective cookie data store among the associated cookie data store and the second cookie data store, wherein the identifier indicates a security mode associated with the respective cookie data store;
   determining the respective cookie data store associated with the received identifier among the associated cookie data store and the second cookie data store; and
   performing one or more operations on the determined respective cookie data store based on the received identifier, wherein the one or more operations are only performed on the determined respective cookie data store according to the security mode associated with the determined respective cookie data store.

2. The method of claim 1, wherein the tab in the window frame includes a second process identifier.

3. The method of claim 2, wherein the second process identifier is a child process of a parent process associated with process identifier of the window frame.

4. The method of claim 1, wherein each tab in the window frame of the web client includes a respective process identifier.

5. The method of claim 1, wherein the security mode is one of a protected or unprotected mode.

6. The method of claim 5, wherein a different cookie data store is utilized based on the security mode.

7. The method of claim 5, wherein a respective session is associated to each security mode.

8. The method of claim 5, wherein the security mode indicates an integrity level of the tab.

9. The method of claim 8, wherein the integrity level is one of a low integrity level, a medium integrity level, and a high integrity level.

10. The method of claim 9, wherein the protected mode is associated with the low integrity level.

11. The method of claim 10, wherein the protected mode disallows write access to one or more system files.

12. The method of claim 11, wherein the protected mode allows access to a corresponding cookie data store associated with the protected mode.

13. The method of claim 9, wherein the unprotected mode is associated with the medium integrity level.

14. The method of claim 1, wherein the identifier indicates a first window type.

15. The method of claim 14, wherein the first window type indicates a browsing mode of the web client.

16. The method of claim 1, wherein the browsing mode is a private browsing mode.

17. A system for providing access to a cookie data store, the system comprising:
  memory;
  one or more processors;
  one or more modules stored in memory and configured for execution by the one or more processors, the modules comprising:
    a browser module configured to provide a first unique identifier associated with a first cookie data store of a web client and a second unique identifier associated with a second cookie data store associated with a secure tab in a window frame of the web client; and
    a cookies module configured to determine a respective cookie data store associated with a received identifier among the first and second cookie data stores, and perform one or more operations on the respective cookie data store based on the received identifier, wherein the identifier indicates a security mode associated with the respective cookie data store and the one or more operations are only performed on the respective cookie data store according to the security mode associated with the respective cookie data store.

18. The system of claim 17, wherein the one or more operations includes at least one of a first operation to retrieve information for a single cookie, a second operation to retrieve all cookies from the cookie data store, a third operation to store a cookie in the cookie data store, a fourth operation to delete a cookie in the cookie data store, or a fifth operation to get all cookie data stores for the web client.

19. A machine-readable medium comprising instructions stored therein, which when executed by a machine, cause the machine to perform operations comprising:
  for a session associated with the tab in the window frame of the web client, determining a unique identifier of an associated cookie data store;
  for a session associated with a secure tab in the window frame of the web client, determining a second cookie data store associated with a secure tab;
  receiving an identifier for a respective cookie data store among the associated cookie data store and the second cookie data store, wherein the identifier indicates a security mode associated with the respective cookie data store;
  determining the respective cookie data store associated with the received identifier among the associated cookie data store and the second cookie data store; and
  performing one or more different operations on the determined respective cookie data store based on the received identifier, wherein the one or more different operations are only performed on the determined respective cookie data store according to the security mode associated with the determined respective cookie data store.

20. The method of claim 1, wherein the associated cookie data store and the second cookie data store are different cookie data stores respectively associated with the tab and the secure tab in the window frame of the web client.

21. The method of claim 20, wherein the tab and the secure tab have different security modes indicating a respective different integrity level corresponding to the tab and the secure tab.

22. The method of claim 21, wherein the respective different integrity level of the tab and the secure tab indicates a different set of privileges granted to each of the tab and the secure tab.

23. The method of claim 21, wherein the security mode of the secure tab is a protected mode that disallows write access to one or more system files and only allows access to the second cookie data store associated with the secure tab.

24. The method of claim 23, wherein the secure tab is associated with a private browsing mode of the web client.

* * * * *